(No Model.) 2 Sheets—Sheet 1.

T. R. CRANE.
GRAIN DRILL.

No. 372,127. Patented Oct. 25, 1887.

WITNESSES:
R. L. Clemmitt
John E. Morris

INVENTOR:
Thos. R. Crane

BY Chas. B. Mann
ATTORNEY.

(No Model.) 2 Sheets—Sheet 2.

T. R. CRANE.
GRAIN DRILL.

No. 372,127. Patented Oct. 25, 1887.

WITNESSES:
R. L. Clemmitt.
John E. Morris.

INVENTOR:
Thos. R. Crane
BY Chas. B. Mann
ATTORNEY.

UNITED STATES PATENT OFFICE.

THOMAS R. CRANE, OF HEATHSVILLE, VIRGINIA.

GRAIN-DRILL.

SPECIFICATION forming part of Letters Patent No. 372,127, dated October 25, 1887.

Application filed August 24, 1887. Serial No. 247,720. (No model.)

*To all whom it may concern:*

Be it known that I, THOMAS R. CRANE, a citizen of the United States, residing at Heathsville, in the county of Northumberland and State of Virginia, have invented certain new and useful Improvements in Grain-Drills, of which the following is a specification.

This invention relates to an improved combined drill and harrow for sowing grain or seed, and is illustrated in the accompanying drawings, in which—

Figure 1:
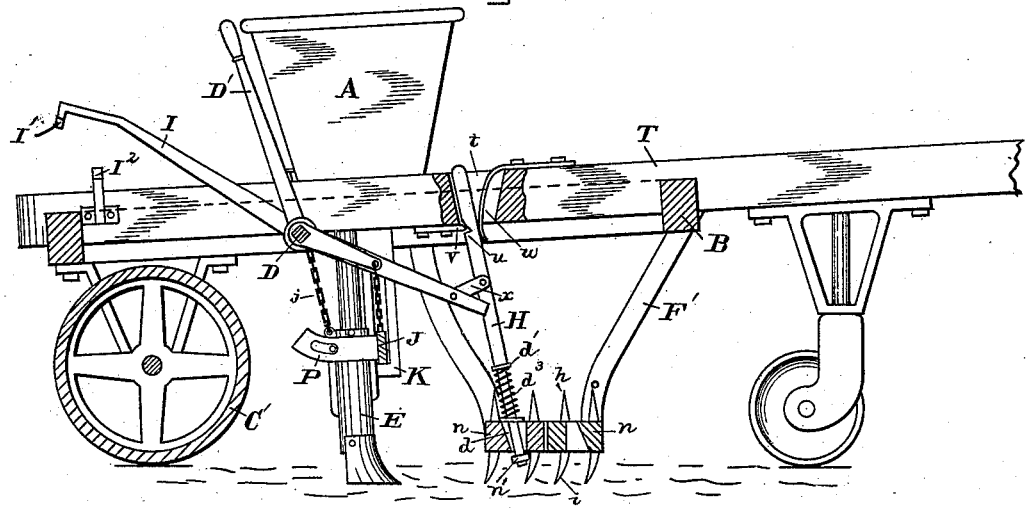
Figure 2:
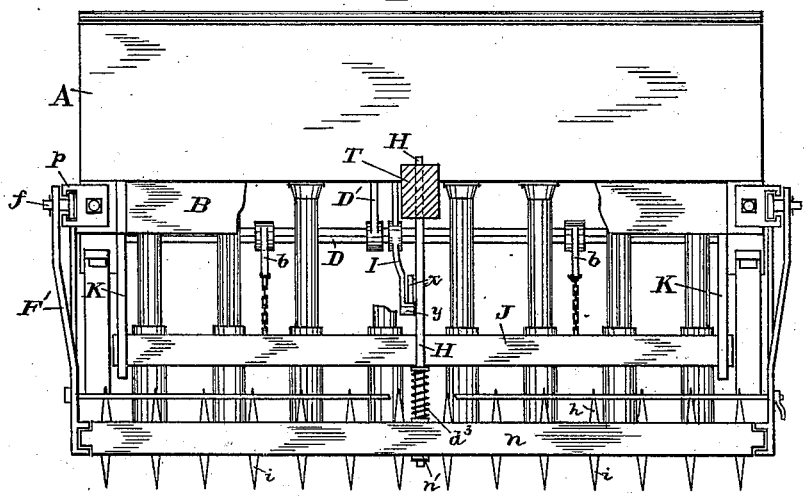
Figure 3:
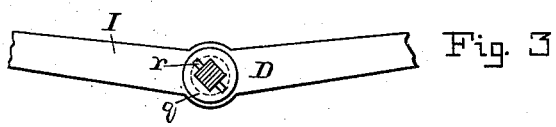
Figure 4:
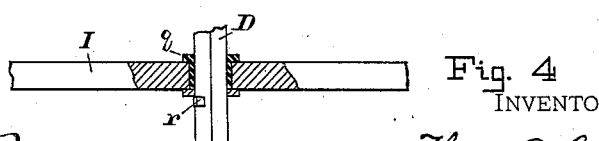
Figure 5:
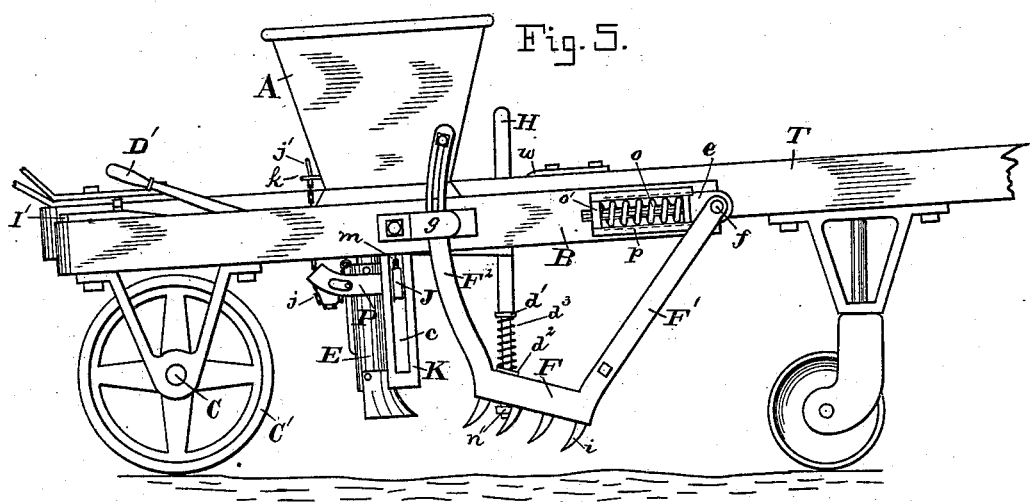
Figure 6:
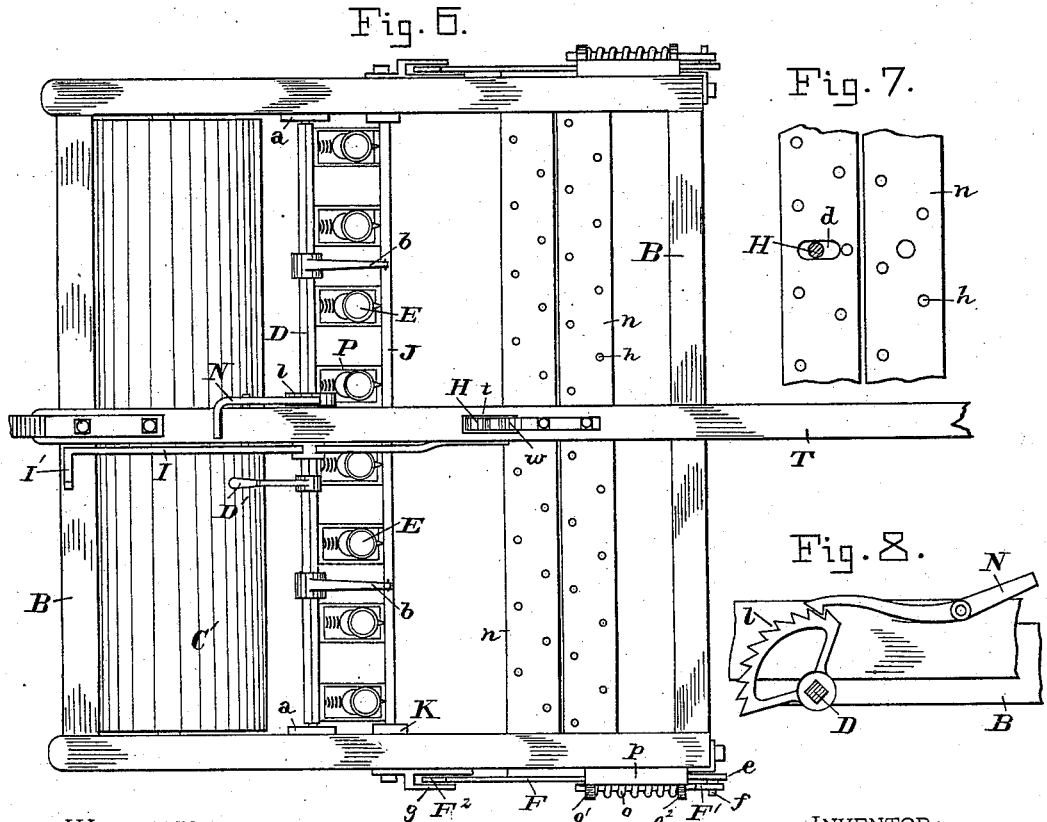
Figure 7:
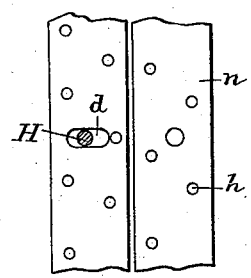
Figure 8:
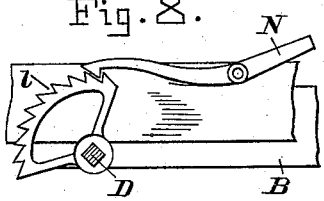

Figure 1 is an elevation of my machine, the greater part of which shows a longitudinal section. Fig. 2 is a vertical cross section, and shows a front elevation of the parts. Figs. 3 and 4 show, in detail, the drill-tube-elevating shaft and the lever thereon for raising the pivoted harrow. Fig. 5 is a side view of the machine in which the vertically-movable drill-tubes and the pivoted harrow are elevated from the ground. Fig. 6 is a top view of the frame and parts which are seen when the hoppers are removed. Fig. 7 is a top view of a portion of the harrow cross-beams, and shows the tapered hole for the depressing rod. Fig. 8 is a detail view of the pawl and ratchet for holding the drill-tube-elevating shaft.

The letter A designates the hopper, which may embrace compartments for grain and fertilizer, and is supported on a frame, B, mounted on an axle, C, having a roller, C'. Instead of the roller, wheels may be employed. The hopper has in its bottom a suitable feed device, not necessary to describe here.

Drill-tubes E convey the grain and fertilizer from their respective hoppers to the ground. Each drill-tube is separately or independently raised and lowered vertically by a chain, $j$, having at its upper end a ring, $j'$, which, when the tube E is down, rests on a suitable support, $k$, back of the hopper. All the drill-tubes E are attached to a bar, J, which extends horizontally crosswise below the frame, and at each end is supported and vertically guided by a vertical hanger-arm, K, which is secured to the frame B. The horizontal crosswise bar J, and all the drill-tubes E attached to it, may be raised and lowered together vertically. To effect this the two hanger-arms K—one of which is secured at each side of the frame—are slotted, as at $c$. The slots serve as guides, and the ends of the said bar J occupy the slots $c$. The bar J may therefore be raised and lowered in said slots $c$.

A rock-shaft, D, extends crosswise of the frame B, and is mounted in suitable bearings, $a$. Two arms, $b$, rigid on the shaft, project forward, and a chain, $m$, connects each arm with the said crosswise bar J. A hand-lever, D', is rigid on the rock-shaft, and is in position to be reached by the driver. By grasping this lever and pulling back the rock-shaft D will be partly turned and the arms $b$ thereof will draw on the crosswise bar J, and all the drill-tubes E will be raised vertically.

If it is desired to sustain the drill-tubes when they are raised, the pawl N, pivoted to the frame, will serve that end by acting on the segment-shaped ratchet $l$, which is mounted on the rock-shaft D. This vertical mode of raising the drill-tubes is of special value in a machine like this, which combines the drill-tubes and harrow, because of the limited room on the frame B for each part of the machine. As the vertical movement here shown requires for its action less room than other constructions heretofore used, I am able to effect a compact organization in one machine of the several parts herein described.

The drill-tubes E are attached to the crosswise bar J by some suitable means, preferably the yielding clamp P, described more fully in other applications for Letters Patent of the United States made by me.

The harrow comprises two side irons, each of which has a straight horizontal part, F, a front upward-projecting arm, F', and a rear upward-projecting arm, F². Suitable crossbeams, $n$, connect the said iron at one side of the machine with the iron at the other side, and these beams have prongs or teeth $h\,i$. The front arm, F', is pivoted by a bolt, $f$, to a movable plate, $e$, which is fitted in a slide, $p$, secured firmly to the frame B. A spiral spring, $o$, is interposed between the rear end, $o'$, of the said slide and a lug, $o^2$, on the front end of the movable plate. It will thus be seen the harrow is pivoted at front and is adapted to yield or give back in case the teeth come in contact with an unyielding object in the ground. The rear arm, F², occupies, loosely, a keeper, q, on the side of the frame, and thereby the rear part of the harrow is free to be raised or lowered. I make a combination, which includes the shaft D, by which all the drill-tubes E are raised and lowered vertically, the pivoted harrow, and a lever, I, pivoted freely on the said shaft, for elevating the harrow.

The lever I may be pivoted in any suitable way on the shaft D, which may be round or square. As the shaft in the present instance is square, a box, q, is provided to fit on it. (See Figs. 3 and 4.) The outer side of the box is round and the lever I has a hole to fit on the round part of the box. The box has flanges to keep the lever confined on it, and a pin, r, retains the box in position on the shaft. Thus the shaft D may turn without affecting the lever, and the lever may be tilted without affecting the shaft. The rear end of the lever has a foot-rest, I'. Any suitable means—such as a rod or chain—may be employed to connect the forward end of the lever I with the harrow. In the present instance this connection consists of a rod, H. By depressing the foot-rest end of the lever the harrow may be elevated from the ground. A hook, I², on the frame serves to keep the lever depressed.

A rod, H, has one end pivoted to the harrow cross-beams, and projects upward. The manner of pivoting the rod H to the harrow is such as to allow the rod a limited endwise movement. The cross-beam n of the harrow has a tapered hole, d, (see Fig. 1,) the largest part of the hole being at the upper surface. The rod H passes down through the hole d, and at the lower surface of the beam n the hole is small enough to fit the rod snug, but not tight. A nut, n', on the lower end of the rod, prevents the latter from being drawn upward. The effect of the tapered hole, it will thus be seen, is to allow the upper end of the rod H to move laterally; and, therefore, the rod is pivoted. The rod has a collar or shoulder, d', and a washer-plate, d², lies loose on top of the cross-beam n. A spiral spring, d³ surrounds the rod between the collar and washer-plate. The spring receives the down-pressure of the rod; and, as the spring is seated on the washer-plate, the pressure is brought to bear on the cross-beam. The rod H passes through a slot, t, in the frame. In the present instance this slot consists of a mortise formed in the central bar, T, of the frame, which serves as a draft-pole. It is, however, obvious that a metal box with a slot, t, might be attached to the frame. The rod H has one or more notches, u, and a catch-plate, v, fixed on the frame in position to take into said notch, as seen in Fig. 1. A spring, w, secured to the frame, presses against the said rod H and keeps it in contact with the catch-plate.

It will be seen that when the harrow is down to the ground, the notch u, on the rod H, will engage with the catch-plate v, and thereby the rod will keep the harrow-teeth pressed into the earth. If, however, the harrow-teeth strike an object in the ground, the spring d will yield sufficiently to allow the harrow to rise and clear the object without disengaging the rod H from the catch-plate v.

Beside the combination, herein described, of drill-tubes raised and lowered vertically, pivoted harrow, and lever I for elevating the harrow, I have contrived another combination which includes, with the same parts, means for releasing the rod H from the catch-plate v, in order to permit the harrow to be raised. The same means insures, also, that the rod H will engage with the catch-plate when the harrow is lowered. A stiff link, x, connects the forward end of the lever I with the pivoted rod H. The link is so arranged (see Fig. 1) that it and the lever I form a bent elbow when the notched rod H and catch-plate v are engaged. When, therefore, it is desired to raise the harrow, the first thing requisite is to disengage the rod H from the catch-plate v. This is effected by the "bent-elbow" position of the link x, as follows: Upon depressing the foot-rest end I' of the lever, its forward end will rise, first slightly, and straighten the bent elbow formed by the link, and result in disengaging the rod H from the catch-plate. As the forward end of the lever continues to rise, a lateral lug, y, with which it is provided, (see Fig. 2,) comes up against the link x, and then the rod H and harrow will be elevated from the ground, as shown in Fig. 5.

When it is desired that the drill-tubes and harrow shall both be put in position for operation, as shown in Fig. 1, the pawl N must be released from the ratchet l, whereupon the shaft D will turn and all the drill-tubes will be lowered. The lever I, pivoted on the shaft D, will be released from the hook I², and thereupon the harrow will be lowered, and at the same time the link x will draw the rod H and cause its notch to engage with the catch-plate.

Having described my invention, I claim and desire to secure by Letters Patent of the United States—

1. The combination of the frame B, rock-shaft D, drill-tubes E, a vertically-movable crosswise bar, J, to which the drill-tubes are attached and which is connected with the rock-shaft, a pivoted harrow, and a lever pivoted on the rock-shaft for raising the harrow.

2. The combination of the frame B, rock-shaft D, drill-tubes E, a vertically-movable crosswise bar, J, to which the drill-tubes are attached and which is connected with the rock-shaft, a pivoted harrow, a rod, H, pivoted to the harrow, a catch-plate to engage with said rod, and a lever, I, pivoted on the rock-shaft and coacting with the said rod.

3. The combination of the frame B, a harrow pivoted to the frame, a rod, H, pivoted to the harrow and projecting up through a slot in the frame, a catch-plate on the frame to engage with said rod, a lever, and a link, x, connecting the said rod and lever.

4. The combination of the frame B, a harrow pivoted to the frame, a depressing-rod, H, projecting up through a slot in the frame, a spring, $d^3$, interposed between the depressing-rod and harrow, and a catch-plate to engage with the rod.

In testimony whereof I affix my signature in presence of two witnesses.

THOMAS R. CRANE.

Witnesses:
JNO. T. MADDOX,
JNO. SANDERSON.